United States Patent
Kaneko (10) Patent No.: US 12,388,271 B2
(45) Date of Patent: Aug. 12, 2025

(54) CELL EQUALIZATION SYSTEM

(71) Applicant: HONDA MOTOR CO., LTD., Tokyo (JP)

(72) Inventor: Tatsuya Kaneko, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 446 days.

(21) Appl. No.: 17/885,095

(22) Filed: Aug. 10, 2022

(65) Prior Publication Data

US 2023/0058220 A1 Feb. 23, 2023

(30) Foreign Application Priority Data

Aug. 23, 2021 (JP) .................. 2021-135959

(51) Int. Cl.
*H02J 7/00* (2006.01)
*B60L 58/22* (2019.01)
(Continued)

(52) U.S. Cl.
CPC ............ *H02J 7/0016* (2013.01); *B60L 58/22* (2019.02); *H01M 10/425* (2013.01);
(Continued)

(58) Field of Classification Search
CPC ..... H02J 7/0016; H02J 2310/48; B60L 58/22; B60L 11/1866; H01M 10/425;
(Continued)

(56) References Cited

U.S. PATENT DOCUMENTS 9,327,610 B2 * 5/2016 Andres ............... H01M 10/441
10,069,311 B2 * 9/2018 Sugeno ............... H02J 7/0048
(Continued)

FOREIGN PATENT DOCUMENTS

CN 102082453 A 6/2011
CN 103548233 A 1/2014
(Continued)

OTHER PUBLICATIONS

JP2020150760A Battery Control Unit (Machine Translation) (Year: 2020).*
(Continued)

*Primary Examiner* — M Baye Diao
(74) *Attorney, Agent, or Firm* — Paratus Law Group, PLLC (57) ABSTRACT

A cell equalization system includes: a battery including a plurality of chargeable cells connected in series and mounted on a vehicle; a battery ECU configured to control the battery; an equalization circuit configured to perform equalization of remaining capacity variation of the plurality of cells; and an equalization control unit configured to control the equalization circuit. The battery ECU is configured to calculate the remaining capacity variation at startup of ECU in which the battery ECU changes from a sleep state to a startup state. The cell equalization system is configured to execute first equalization processing for performing the equalization when the battery ECU is in the startup state, and second equalization processing for performing the equalization when the battery ECU is in the sleep state.

8 Claims, 7 Drawing Sheets

(51) Int. Cl.
  *H01M 10/42* (2006.01)
  *H01M 10/44* (2006.01)
  *H01M 50/204* (2021.01)
  *H01M 50/51* (2021.01)

(52) U.S. Cl.
  CPC ....... *H01M 10/441* (2013.01); *H01M 50/204* (2021.01); *H01M 50/51* (2021.01); *H01M 2010/4271* (2013.01); *H01M 2220/20* (2013.01)

(58) Field of Classification Search
  CPC .. H01M 10/441; H01M 50/204; H01M 50/51; H01M 2010/4271; H01M 2220/20; Y02E 60/10; Y02T 10/70
  USPC .......................................................... 320/132
  See application file for complete search history.

(56) References Cited

U.S. PATENT DOCUMENTS

| | | | | |
|---|---|---|---|---|
| 11,167,661 | B2 * | 11/2021 | Wang | H01M 10/441 |
| 2006/0119319 | A1 | 6/2006 | Sakurai et al. | |
| 2011/0127962 | A1 | 6/2011 | Murao et al. | |
| 2011/0127963 | A1 | 6/2011 | Murao et al. | |
| 2011/0234170 | A1 * | 9/2011 | Zhang | H02J 7/0016 320/134 |
| 2013/0002202 | A1 | 1/2013 | Kuraishi | |
| 2014/0009092 | A1 * | 1/2014 | Ma | H02J 7/0014 320/108 |
| 2014/0217982 | A1 | 8/2014 | Ohkawa et al. | |
| 2019/0135128 | A1 * | 5/2019 | Kim | H01M 10/441 |
| 2020/0195020 | A1 | 6/2020 | Tanaka | |
| 2021/0031646 | A1 * | 2/2021 | Kim | B60L 53/12 |
| 2021/0155116 | A1 * | 5/2021 | Wang | B60L 58/22 |
| 2023/0053822 | A1 | 2/2023 | Tanaka | |

FOREIGN PATENT DOCUMENTS

| | | | | |
|---|---|---|---|---|
| CN | 108206560 | A | 6/2018 | |
| CN | 111416397 | A | 7/2020 | |
| CN | 112477697 | A | 3/2021 | |
| DE | 112019005131 | T5 * | 7/2021 | .............. B60L 58/22 |
| EP | 2328256 | A2 * | 6/2011 | .............. B60L 58/19 |
| EP | 4152471 | A1 * | 3/2023 | ........... G01R 31/367 |
| JP | H11355904 | A * | 12/1992 | ............ H02J 7/0021 |
| JP | 2005328603 | A * | 11/2005 | ................ H02J 7/00 |
| JP | 2006-166615 | A | 6/2006 | |
| JP | 3946391 | B2 * | 7/2007 | .............. B60K 6/20 |
| JP | 2007244142 | A * | 9/2007 | ............ Y02E 60/10 |
| JP | 4220953 | B2 * | 2/2009 | ................ H02J 7/02 |
| JP | 2011-115015 | A | 6/2011 | |
| JP | 2011-115016 | A | 6/2011 | |
| JP | 2013-013236 | A | 1/2013 | |
| JP | 2014183727 | A * | 9/2014 | ............ Y02E 60/10 |
| JP | 2016019302 | A * | 2/2016 | ............ Y02E 60/10 |
| JP | 2020-099111 | A | 6/2020 | |
| JP | 2020-150760 | A | 9/2020 | |
| JP | 2023-027917 | A | 3/2023 | |
| KR | 101583694 | B1 * | 1/2016 | ............ H02J 7/0016 |
| WO | WO 2012/160638 | A1 | 11/2012 | |

OTHER PUBLICATIONS

Apr. 18, 2023, Translation of Japanese Office Action issued for related JP Application No. 2021-135959.
Feb. 28, 2025, Translation of Chinese Office Action issued for related CN Application No. 202210941126.3.

* cited by examiner

CELL EQUALIZATION SYSTEM

CROSS REFERENCE TO RELATED APPLICATIONS

This application claims priority to Japanese Patent Application No. 2021-135959 filed on Aug. 23, 2021, the content of which is incorporated herein by reference.

TECHNICAL FIELD

The present invention relates to a cell equalization system for a vehicle battery.

BACKGROUND ART

In recent years, as a specific measure against global climate change, efforts toward realization of a low-carbon society or a decarbonized society have become active. Also in vehicles, a reduction in a $CO_2$ emission is strongly required, and a drive source is rapidly electrified. Specifically, a vehicle including an electric motor as a drive source of the vehicle and a battery as a secondary battery capable of supplying electric power to the electric motor, such as an electrical vehicle or a hybrid electrical vehicle, has been developed.

In a battery, a desired voltage can be obtained by connecting a plurality of cells in series to form a battery module, but when charging and discharging are repeated, a variation in voltages of respective cells may occur due to variations in capacitance and internal resistance of the respective cells, and excessive voltages or polarity inversion may occur in the cells, resulting in deterioration of the cells. Therefore, in order to prevent deterioration of a cell and maintain charging and discharging performance, a cell equalization system that equalizes voltages of respective cells is required.

JP 2006-166615 A, JP 2013-13236 A, and JP 2020-99111 A describe a cell equalization system. Cell equalization processing is control for equalizing a variation in remaining capacity (cell capacity×SOC [%]) or a variation in voltage of respective cells. In the present specification, a variation in remaining capacity or a variation in voltage of cells is collectively referred to as a remaining capacity variation. The remaining capacity variation is constantly calculated during startup of a battery ECU that controls a battery, and the cell equalization processing is performed when the calculated value exceeds a threshold value.

However, when the remaining capacity variation is calculated during the startup of the battery ECU, since an error or a variation occurs in an estimated value of a state of charge (SOC) due to control of discharge and/or charge for traveling, calculation accuracy of the remaining capacity variation is low, and equalization cannot be executed accurately.

When the equalization processing is performed during the startup of the battery ECU, voltage detection accuracy of the cell may deteriorate due to an IR drop or the like due to discharge resistance, and an All electric range (AER) may be adversely affected by a decrease in estimation accuracy of the SOC and/or an increase in an error margin.

An object of the present invention is to provide a cell equalization system capable of accurately calculating a remaining capacity variation and accurately executing equalization.

SUMMARY OF INVENTION

According to an aspect of the present invention, there is provided a cell equalization system including: a battery including a plurality of chargeable cells connected in series and mounted on a vehicle; a battery ECU configured to control the battery; an equalization circuit configured to perform equalization of remaining capacity variation of the plurality of cells; and an equalization control unit configured to control the equalization circuit. The battery ECU is configured to calculate the remaining capacity variation at startup of the battery ECU in which the battery ECU changes from a sleep state to a startup state. The cell equalization system is configured to execute first equalization processing for performing the equalization when the battery ECU is in the startup state, and second equalization processing for performing the equalization when the battery ECU is in the sleep state.

DESCRIPTION OF EMBODIMENTS

Hereinafter, an embodiment of the present invention will be described with reference to FIGS. 1 to 7.
(Configuration of Cell Equalization System)

Figure 1:
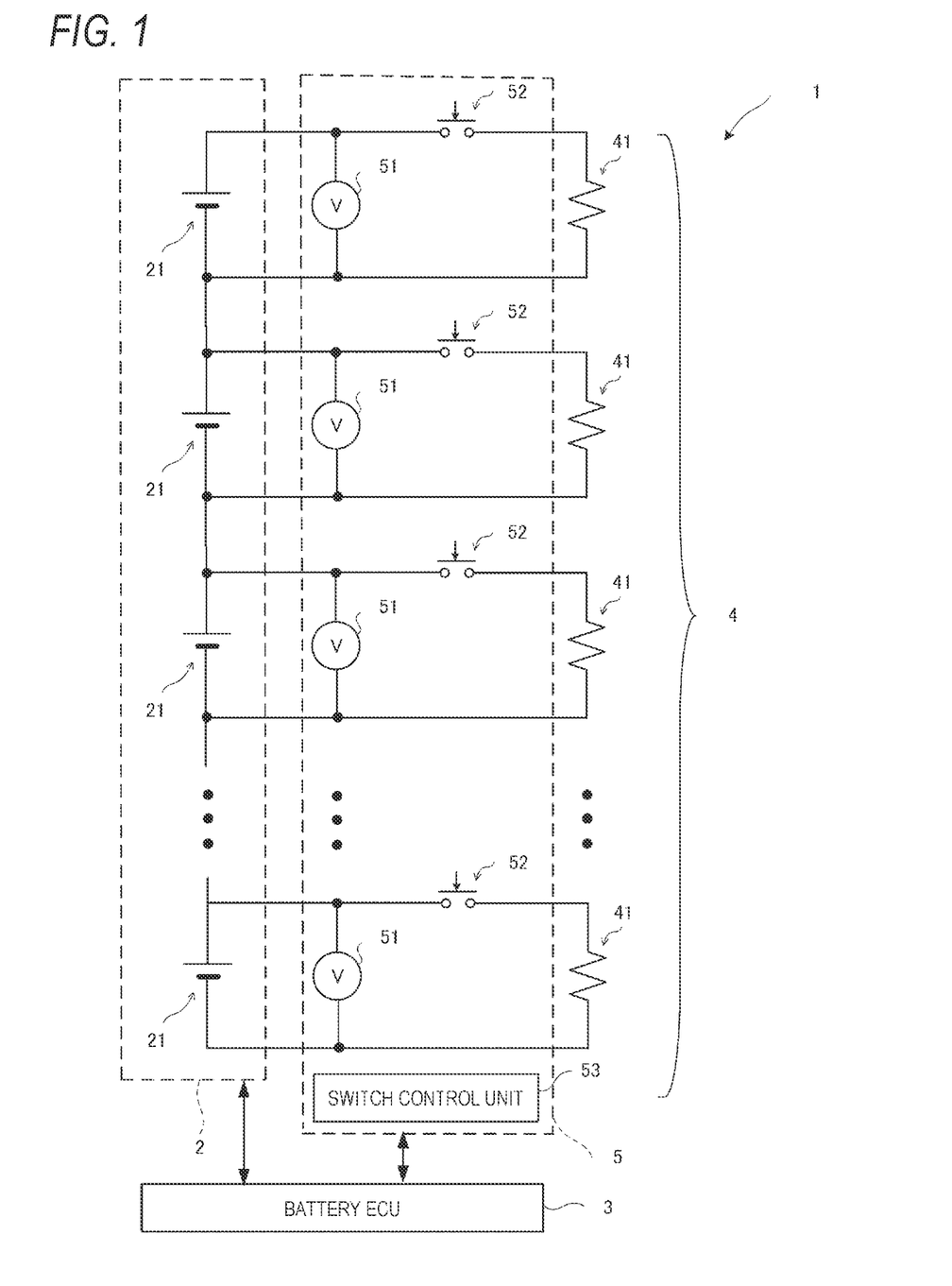
FIG. 1 is a circuit diagram showing a configuration of a cell equalization system 1.

As shown in FIG. 1, the cell equalization system 1 includes a battery 2 having a plurality of chargeable cells 21, a battery ECU 3 that controls the battery 2, an equalization circuit 4 that equalizes a remaining capacity variation of the plurality of cells 21, and an equalization control unit 5 that controls the equalization circuit 4. The cell equalization system 1 of the present embodiment is applied to an electric vehicle such as an electrical vehicle or a hybrid vehicle, but the type of the vehicle is not limited thereto.
(Battery)

Figure 2:
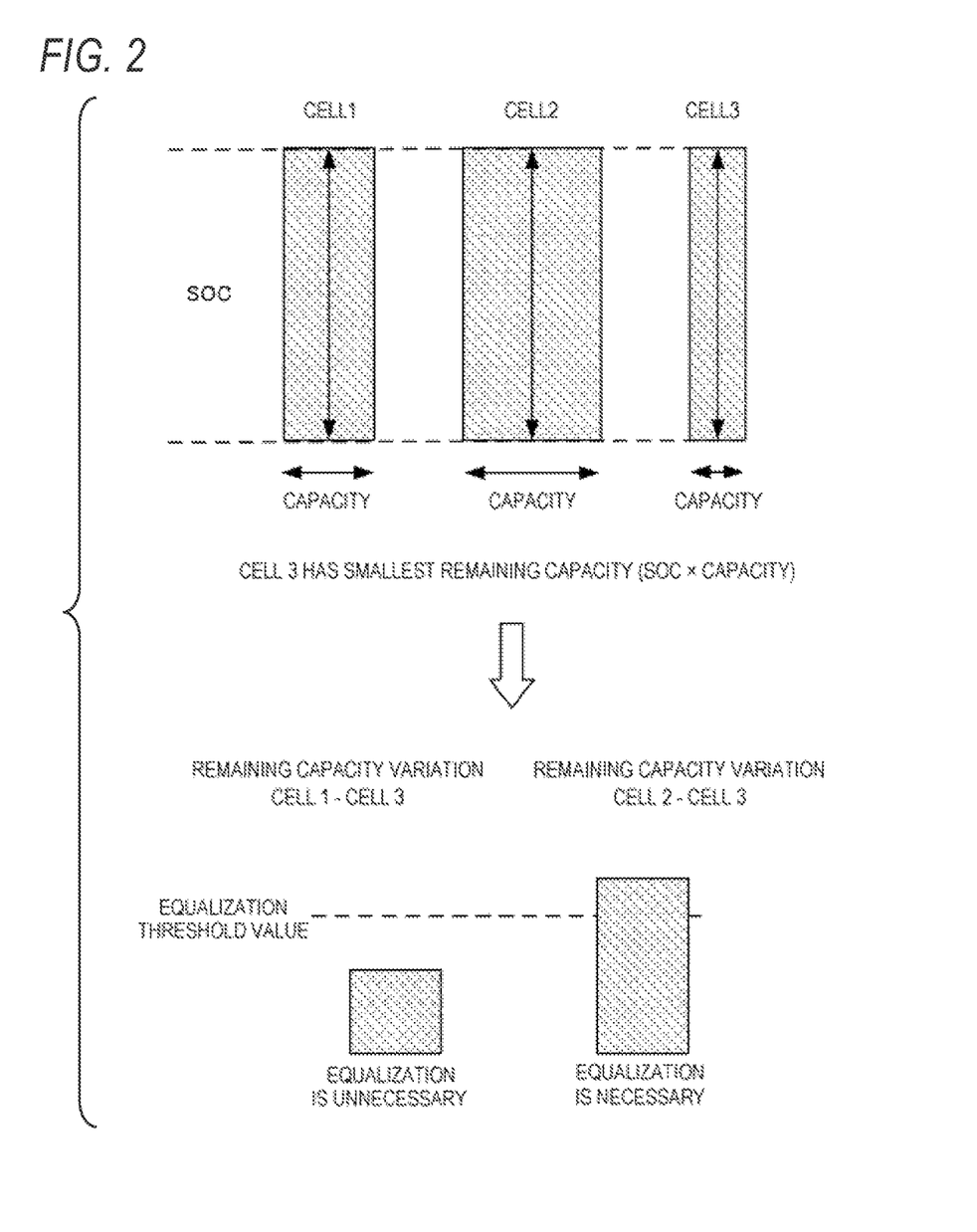
FIG. 2 is an explanatory diagram showing a relation among remaining capacities of respective cells, a remaining capacity variation of the respective cells, and an equalization threshold value.

The battery 2 obtains a desired voltage by connecting the plurality of cells 21 in series to form a battery module. As shown in FIG. 2, remaining capacities of respective cells 21 can be expressed by cell capacity×SOC (state of charge) [%]. Here, the cell capacity varies not only in a production stage, but also changes depending on progress of deterioration. For example, the progress of deterioration varies depending on a variation in temperature of the cells 21 in the battery module. The cells 21 perform self-discharge while being left to stand, and discharge amounts of the cells 21 are different. Therefore, the remaining capacities of the respective cells 21 vary.

The remaining capacity variation of the respective cells 21 may cause an excessive voltage or polarity inversion in the cells 21 and deteriorate the cells 21. Therefore, in order to prevent deterioration of the cells 21 and maintain charging and discharging performance, equalization processing of equalizing the remaining capacity variation of the respective cells 21 is performed.

As shown in FIG. 2, the equalization processing of the cells 21 is control for calculating the remaining capacity variation of the respective cells 21, discharging a cell 21 having a larger remaining capacity when the calculated remaining capacity variation exceeds a predetermined threshold value, and equalizing the remaining capacity variation.

(Battery ECU)

The battery ECU 3 is a control unit that manages charging and discharging of the battery 2, and is switched between a startup state and a sleep state in response to an ignition signal of the vehicle (on/off operation signal of the vehicle system). Specifically, when an ignition-on signal is input, the battery ECU 3 shifts from the sleep state to the startup state substantially at the same time, and when an ignition-off signal is input, the battery ECU 3 shifts from the startup state to the sleep state after a predetermined time or after execution of predetermined processing. In the present invention, the time of startup of the battery ECU 3 refers to within 1 second, preferably within 0.5 second, from the time of reception of the ignition-on signal.

The battery ECU 3 of the present embodiment not only manages charging and discharging of the battery 2, but also executes processing of calculating the remaining capacity variation of the respective cells 21, processing of determining whether equalization is necessary based on the remaining capacity variation of the respective cells 21, processing of calculating an equalization operation time by the equalization control unit 5, process of prohibiting the equalization, and the like. Details of these processing will be described later.

(Equalization Circuit)

The equalization circuit 4 includes a plurality of load elements capable of discharging the respective cells 21 in the equalization processing. The load elements of the present embodiment are resistors 41 that convert electricity into heat, and are connected to the cells 21 via the equalization control unit 5.

(Equalization Control Unit)

The equalization control unit 5 includes a plurality of voltage sensors 51 that detect voltages of the respective cells 21, a plurality of switches 52 that open and close power transmission paths of the respective cells 21 and the resistors 41, and a switch control unit 53 that outputs detection values of the voltage sensors 51 to the battery ECU 3 and closes the specified switch 52 for a specified time in accordance with an equalization operation instruction (specifying an operation switch and operation time) input from the battery ECU 3.

Specifically, the switch control unit 53 is a processor (computer).

(In-Startup Equalization Processing and In-Sleep Equalization Processing)

Figure 3:
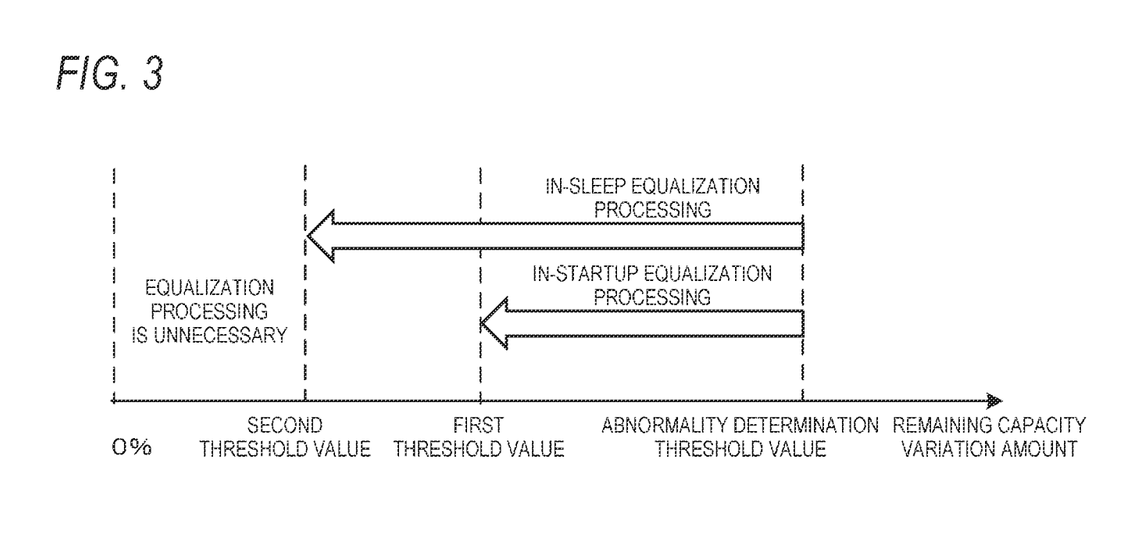
FIG. 3 is an explanatory diagram showing a selective use of in-startup equalization processing performed during startup of a battery ECU and in-sleep equalization processing performed during sleep of the battery ECU.

As shown in FIG. 3, the equalization of the cells 21 executed by the equalization control unit 5 includes in-startup equalization processing in which the equalization is performed when the battery ECU 3 is in the startup state, and in-sleep equalization processing in which the equalization is performed when the battery ECU 3 is in the sleep state.

The in-startup equalization processing has an advantage that the equalization can be appropriately performed even for a vehicle (for example, a taxi, a long-distance transport vehicle, or the like) having a long startup time of the battery ECU 3. However, when the equalization is performed in the startup state of the battery ECU 3, the voltage detection accuracy of the cells 21 may deteriorate due to an IR drop or the like due to discharge resistance, and the vehicle performance may deteriorate due to a decrease in estimation accuracy of the SOC and/or an increase in an error margin.

Further, in the in-sleep equalization processing, by performing the equalization when the battery ECU 3 is in the sleep state, it is possible to prevent deterioration of the vehicle performance during traveling of the vehicle. In a case of performing the in-sleep equalization processing, the battery ECU 3 instructs the switch control unit 53 of the equalization operation time, and then shifts to the sleep state. The switch control unit 53 executes the equalization until the instructed operation time elapses. During this period, the battery ECU 3 maintains the sleep state. Accordingly, even when the battery ECU 3 is in the sleep state, the equalization processing can be performed. The battery ECU 3 is always in the startup state in the ignition-on state. On the other hand, the battery ECU 3 is basically in the sleep state in the ignition-off state, but is in the startup state during external charging even in the ignition-off state.

(Various Processing of Battery ECU)

Next, various processing of the battery ECU 3 described above will be described with reference to FIGS. 3 to 7.

(Calculation of Remaining Capacity Variation)

The battery ECU 3 calculates the remaining capacity variation of the respective cells 21 based on the following equation (1). Here, each cell SOC and each cell capacity are estimated values calculated using the detection values of the voltage sensor 51 or a predetermined estimation logic.

$$\text{Remaining capacity variation of respective cells} = \text{each cell SOC} \times \text{each cell capacity} - \min(\text{each cell SOC} \times \text{each cell capacity}) \quad (1)$$

Figure 4:
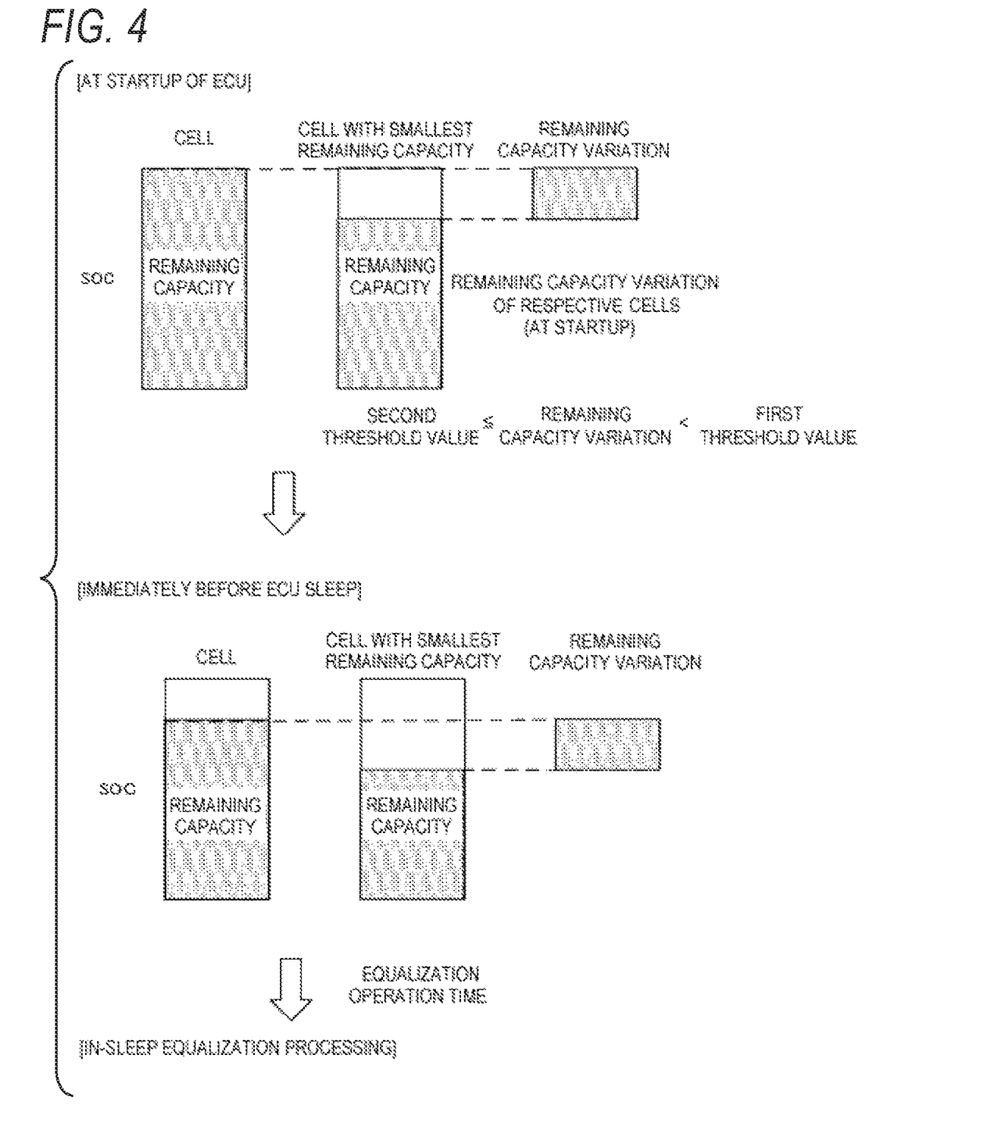
FIG. 4 is an explanatory diagram in a case where the in-startup equalization processing is not performed after startup of the battery ECU, and the in-sleep equalization processing is performed after sleep of the battery ECU.
Figure 5:
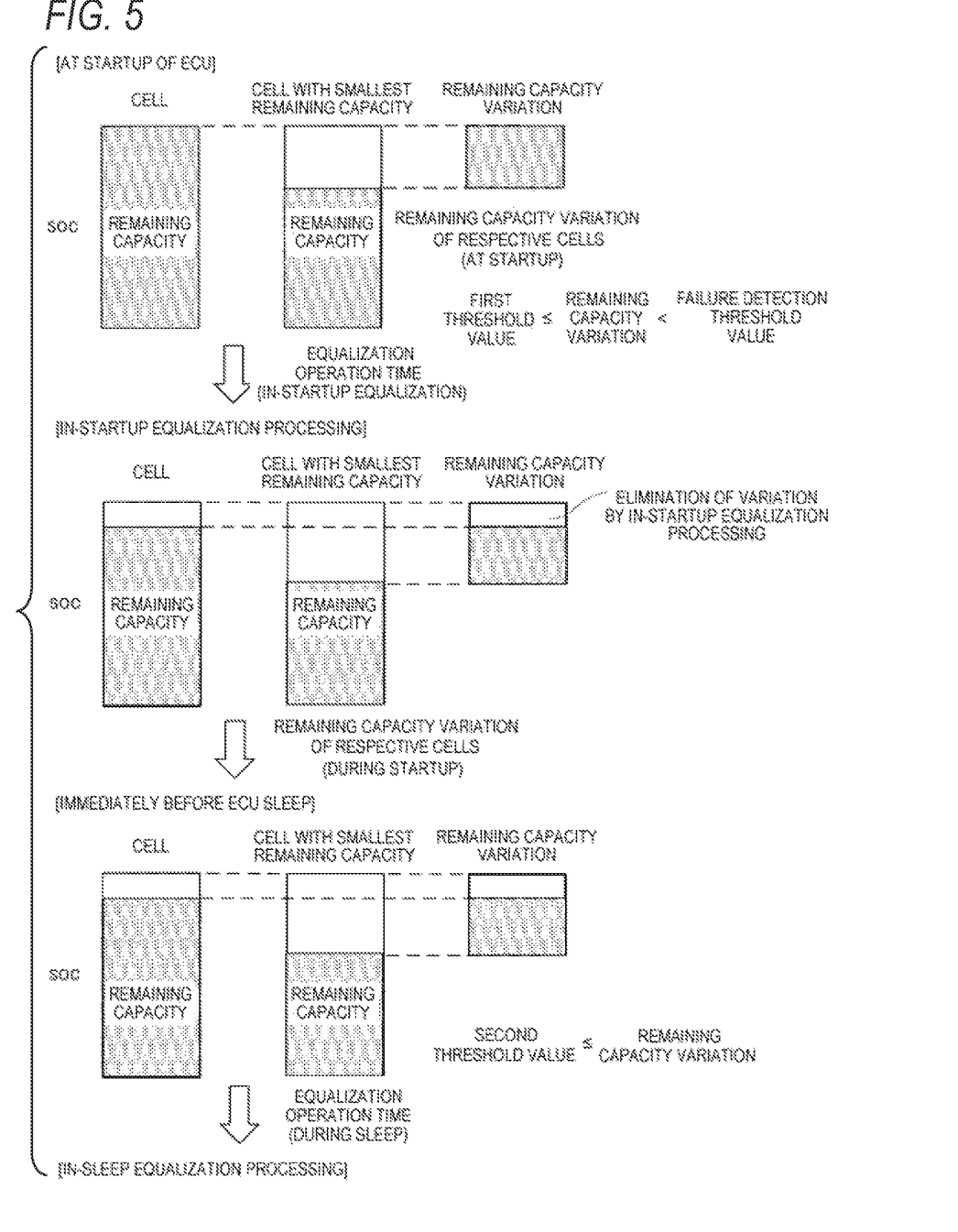
FIG. 5 is an explanatory diagram in a case where the in-startup equalization processing is performed after startup of the battery ECU, and the in-sleep equalization processing is performed after sleep of the battery ECU.

As shown in FIGS. 4 and 5, the battery ECU 3 calculates the remaining capacity variation of the respective cells 21 at startup of the ECU from the sleep state to the startup state. Accordingly, compared with a case where the remaining capacity variation is calculated during startup of the battery ECU 3, the remaining capacity variation can be calculated more accurately. The reason is that during the startup of the battery ECU 3, an error or a variation occurs in an estimated value of the SOC due to control of discharge and/or charge for traveling, and the calculation accuracy of the remaining capacity variation calculated based on the estimated value of the SOC or the like decreases.

Figure 6:
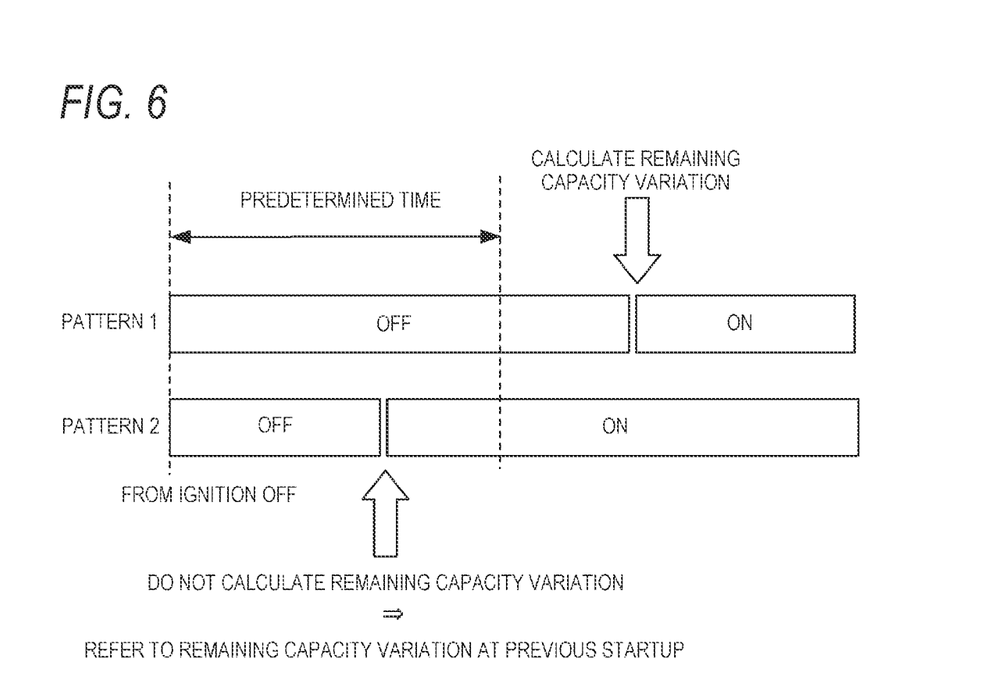
FIG. 6 is an explanatory diagram showing a relation between calculation processing of the remaining capacity variation of each cell and a time from ignition off to startup of the battery ECU.

As shown in FIG. 6, the battery ECU 3 calculates the remaining capacity variation of the respective cells 21 when an elapsed time from the ignition off to the startup state exceeds the predetermined time, and does not calculate the remaining capacity variation of the respective cells 21 when the elapsed time is less than the predetermined time. That is, when the elapsed time from the ignition off to the startup state exceeds the predetermined time, a closed circuit voltage (CCV) can be acquired as an open circuit voltage (OCV) after polarization is eliminated. Therefore, the SOC with high accuracy can be acquired using SOC-OCV characteristic data, and the calculation accuracy of the remaining capacity variation calculated based on the SOC or the like can be improved.

(Determination of Necessity of Equalization)

As shown in FIG. 3, the battery ECU 3 causes the equalization control unit 5 to execute the in-startup equalization processing when the remaining capacity variation of the respective cells 21 is equal to or greater than a first threshold value (for example, 2%), and causes the equalization control unit 5 to execute the in-sleep equalization processing when the remaining capacity variation of the respective cells 21 is equal to or greater than a second threshold value (for example, 1%) smaller than the first threshold value. That is, the in-startup equalization processing is executed only when the remaining capacity variation of the respective cells 21 is large, and basically, the in-sleep equalization processing is preferentially executed, so that it is possible to prevent the deterioration of the vehicle performance during the traveling of the vehicle.

As shown in FIG. 3, the first threshold value is set based on an abnormality determination threshold value (for example, 10%) related to the remaining capacity variation and an estimation error of the remaining capacity variation. For example, the first threshold value is set to a value smaller than a value obtained by subtracting the estimation error from the abnormality determination threshold value. In this way, by setting the first threshold value in consideration of the estimation error of the remaining capacity variation with respect to the abnormality determination threshold value, it is possible to prevent erroneous detection.

When the battery ECU 3 calculates the remaining capacity variation of the respective cells 21 at the startup of the ECU (pattern 1 in FIG. 6), the battery ECU 3 determines whether the equalization is necessary based on the remaining capacity variation, and when the battery ECU 3 does not calculate the remaining capacity variation of the respective cells 21 at the startup of the ECU (pattern 2 in FIG. 6), the battery ECU 3 determines whether the equalization is necessary based on the remaining capacity variation calculated last time. In this way, even when the remaining capacity variation is not calculated at the startup of the ECU, the accuracy of determination of the necessity of the equalization can be prevented from being deteriorated by determining whether the equalization is necessary based on the remaining capacity variation calculated last time.

(Calculation of Equalization Operation Time)

When the battery ECU 3 determines that the in-sleep equalization processing is necessary (second threshold value≤remaining capacity variation<first threshold value), as shown in FIG. 4, the battery ECU 3 calculates the equalization operation time based on the following equation (2), and instructs the switch control unit 53 to perform the equalization immediately before the sleep. Here, a maximum value of the remaining capacity variation is a largest variation of remaining capacity among the remaining capacity variations of the plurality of cells 21 at the startup of the ECU.

$$\text{Equalization operation time}=(\text{maximum value of remaining capacity variation (at startup of ECU)}-\text{second threshold value})/\text{equalization current} \quad (2)$$

When the battery ECU 3 determines that the in-startup equalization processing is necessary, the battery ECU 3 calculates the equalization operation time based on the following equation (3), and instructs the switch control unit 53 to perform the equalization during the startup of the ECU.

$$\text{Equalization operation time}=(\text{maximum value of remaining capacity variation (at startup of ECU)}-\text{first threshold value})/\text{equalization current} \quad (3)$$

As shown in FIG. 5, when executing the in-startup equalization processing, the battery ECU 3 sequentially calculates the remaining capacity variation of the respective cells 21 during the startup based on the following equation (4), and determines whether the in-sleep equalization processing is necessary based on the remaining capacity variation immediately before the sleep.

$$\text{Remaining capacity variation of respective cells (during startup of ECU)}=\text{remaining capacity variation of respective cells (at startup of ECU)}-\text{equalization current}\times\text{operation time} \quad (4)$$

As shown in FIG. 5, when executing the in-sleep equalization processing after the in-startup equalization processing, the battery ECU 3 calculates the equalization operation time based on the following equation (5), and instructs the switch control unit 53 to perform the equalization immediately before the sleep.

$$\text{Equalization operation time}=(\text{maximum value of remaining capacity variation (immediately before sleep of ECU)}-\text{second threshold value})/\text{equalization current} \quad (5)$$

In this way, even when the in-sleep equalization processing is executed after the in-startup equalization processing, it is possible to appropriately set the equalization operation time.

(Prohibition of Equalization)

Figure 7:
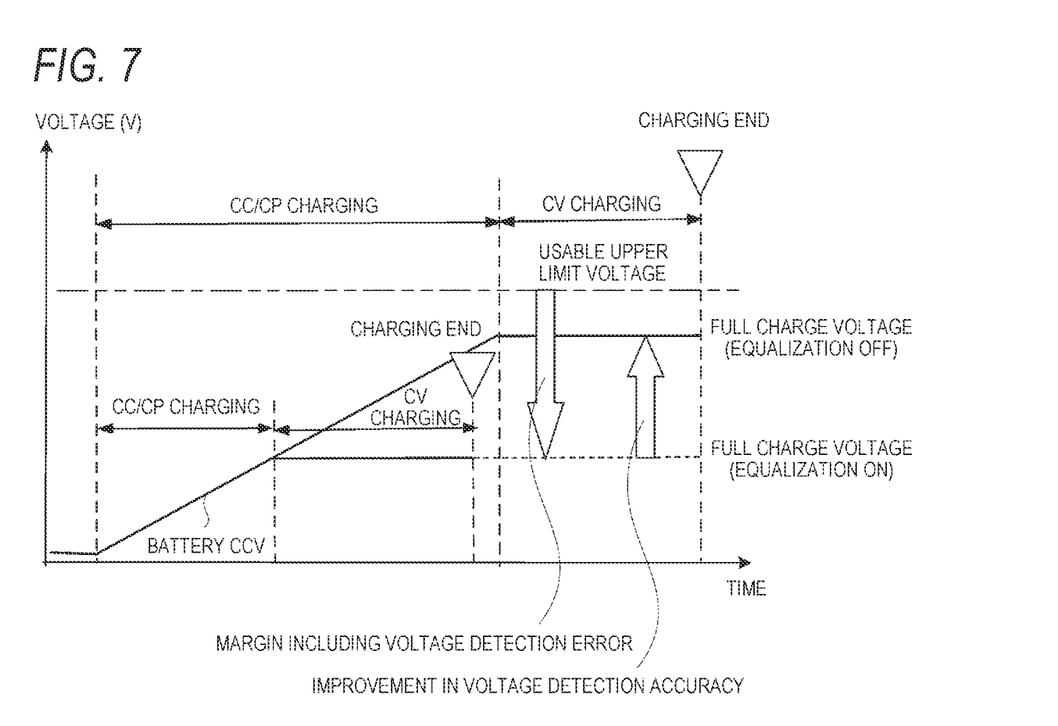
FIG. 7 is an explanatory diagram showing a relation between external charging of a battery and equalization processing.

The battery 2 can be externally charged (charged by an external power supply) by CC charging (constant current charging), CP charging (constant power), CV charging (constant voltage charging), or the like. FIG. 7 shows a relation between a time and a battery voltage in a CC-CV (CP-CV) charging method in which the CV charging is performed after charging to a predetermined voltage by the CC charging or the CP charging.

When performing such battery charging, the battery ECU 3 can execute the in-startup equalization processing as necessary during the CC charging or the CP charging, but prohibits the execution of the in-startup equalization processing during the CV charging. The reason is that, when the in-startup equalization processing is executed during the CV charging, it is necessary to widen the error margin in consideration of deterioration of the voltage detection accuracy in the in-startup equalization processing, a full charge voltage has to be set to be low, and charging cannot be performed efficiently. In the present embodiment, it is possible to prevent deterioration of charging efficiency by prohibiting the in-startup equalization processing during the CV charging.

Although various embodiments have been described above with reference to the drawings, it is needless to say that the present invention is not limited to such examples. It is apparent to those skilled in the art that various changes and modifications can be conceived within the scope of the claims, and it is also understood that such changes and modifications belong to the technical scope of the present invention. Constituent elements in the embodiments described above may be combined freely within a range not departing from the spirit of the present invention.

In the present specification, at least the following matters are described. Although corresponding components or the like in the above embodiment are shown in parentheses, the present invention is not limited thereto.

(1) A cell equalization system (cell equalization system 1) including:

a battery (battery 2) including a plurality of chargeable cells (cells 21) connected in series and mounted on a vehicle;

a battery ECU (battery ECU 3) configured to control the battery;

an equalization circuit (equalization circuit 4) configured to perform equalization of remaining capacity variation of the plurality of cells; and an equalization control unit (equalization control unit 5) configured to control the equalization circuit, in which the battery ECU is configured to calculate the remaining capacity variation at startup of ECU in which the battery ECU changes from a sleep state to a startup state, and the cell equalization system is configured to execute first equalization processing (in-startup equalization processing) for performing the equalization when the battery ECU is in the startup state, and second equalization processing (in-sleep equalization processing) for performing the equalization when the battery ECU is in the sleep state.

When the remaining capacity variation is calculated in the startup state of the battery ECU, since an error or a variation occurs in an estimated value of the SOC due to control of discharge and/or charge for traveling, the calculation accuracy of the remaining capacity variation is low, and the equalization cannot be executed accurately. According to (1), by calculating the remaining capacity variation at the startup of the ECU, it is possible to accurately calculate the remaining capacity variation and accurately execute the equalization.

When the equalization is performed in the startup state of the battery ECU, the voltage detection accuracy of the cell may deteriorate due to an IR drop or the like due to discharge resistance, and the vehicle performance may deteriorate due to a decrease in estimation accuracy of the SOC and/or an increase in an error margin. According to (1), in the second equalization processing, by performing the equalization when the battery ECU is in the sleep state, it is possible to prevent deterioration of the vehicle performance during traveling of the vehicle.

(2) The cell equalization system according to claim 1), in which the cell equalization system is configured to execute the first equalization processing when the remaining capacity variation is equal to or greater than a first threshold value, and the second equalization processing when the remaining capacity variation is equal to or greater than a second threshold value which is smaller than the first threshold value.

According to (2), the first equalization processing is executed only when the remaining capacity variation is large, and basically, the second equalization processing is preferentially executed, so that it is possible to prevent the deterioration of the vehicle performance during the traveling of the vehicle.

(3) The cell equalization system according to claim 2), in which the first threshold value is set based on an abnormality determination threshold value related to the remaining capacity variation and an estimation error of the remaining capacity variation.

According to (3), by setting the first threshold value in consideration of the estimation error of the remaining capacity variation with respect to the abnormality determination threshold value, it is possible to prevent erroneous detection.

(4) The cell equalization system according to (2) or (3), in which the battery ECU is configured to calculate the remaining capacity variation when an elapsed time from ignition off to the startup state exceeds a predetermined time, and not to calculate the remaining capacity variation when the elapsed time is less than the predetermined time.

According to (4), by calculating the remaining capacity variation only when the elapsed time from the ignition off to the startup state exceeds the predetermined time, the closed circuit voltage (CCV) can be acquired as the open circuit voltage (OCV) after the polarization is eliminated. By acquiring the SOC using the SOC-OCV characteristic data, the detection accuracy of the SOC is improved, and the calculation accuracy of the remaining capacity variation can be improved.

(5) The cell equalization system according to (4), in which the battery ECU is configured to determine whether the equalization is necessary based on the remaining capacity variation when the remaining capacity variation is calculated at startup of ECU, and determine whether the equalization is necessary based on the remaining capacity variation calculated last time when the remaining capacity variation is not calculated at the startup of ECU.

According to (5), the accuracy of determination of necessity of the equalization can be improved by determining whether the equalization is necessary based on the remaining capacity variation when the remaining capacity variation is calculated at the startup of ECU. Further, the accuracy of determination of the necessity of the equalization can be prevented from being deteriorated by determining whether the equalization is necessary based on the remaining capacity variation calculated last time when the remaining capacity variation is not calculated at the startup of ECU.

(6) The cell equalization system according to any one of (3) to (5), in which when determining that the second equalization processing is necessary, the battery ECU calculates an operation time based on a maximum value of the remaining capacity variation, which is a largest variation of remaining capacity among the remaining capacity variation of the plurality of cells at the startup of ECU, the second threshold value, and an equalization current.

According to (6), even when the battery ECU is in the sleep state, the equalization processing can be performed.

(7) The cell equalization system according to any one of (3) to (5), in which the cell equalization system is configured to execute the second equalization processing after the first equalization processing, and the battery ECU is configured to calculate an operation time of the first equalization processing based on a maximum value of the remaining capacity variation, which is a largest variation of remaining capacity among the remaining capacity variations of the plurality of cells at the startup of the ECU, the first threshold value, and an equalization current, calculate the maximum value of the remaining capacity variation immediately before sleep of ECU in which the battery ECU changes from the startup state to the sleep state based on the maximum value of the remaining capacity variation at the startup of the ECU, the operation time of the first equalization processing, and the equalization current, and calculate an operation time of the second equalization processing after the first equalization processing based on the calculated maximum value of the remaining capacity variation, the second threshold value, and the equalization current.

According to (7), even when the second equalization processing is executed after the first equalization processing, it is possible to appropriately set the operation time.

(8) The cell equalization system according to (6) or (7), in which
in the second equalization processing, the battery ECU maintains the sleep state, and the equalization control unit executes the equalization until the operation time elapses.

According to (8), even when the battery ECU is in the sleep state, the equalization processing can be performed.

(9) The cell equalization system according to any one of (1) to (8), in which
the battery ECU is configured to prohibit the first equalization processing during external charging of the battery and during constant voltage control.

According to (9), since the full charge voltage has to be set to be low and the charging cannot be performed efficiently when the error margin is widened in consideration of deterioration of the voltage detection accuracy in the first equalization processing, it is possible to prevent the deterioration of the charging efficiency by prohibiting the first equalization processing during the external charging of the battery and during the constant voltage control.

What is claimed is:

1. A cell equalization system comprising:
a battery including a plurality of chargeable cells connected in series and mounted on a vehicle;
a battery ECU configured to control the battery;
an equalization circuit configured to perform equalization of remaining capacity variation of the plurality of cells; and
an equalization control unit configured to control the equalization circuit, wherein
the battery ECU is configured to calculate the remaining capacity variation at startup of the battery ECU in which the battery ECU changes from a sleep state to a startup state, and
the cell equalization system is configured to execute
first equalization processing for performing the equalization when the battery ECU is in the startup state, and
second equalization processing for performing the equalization when the battery ECU is in the sleep state, wherein
the cell equalization system is configured to execute
the first equalization processing when the remaining capacity variation is equal to or greater than a first threshold value, and
the second equalization processing when the remaining capacity variation is equal to or greater than a second threshold value which is smaller than the first threshold value.

2. The cell equalization system according to claim 1, wherein
the first threshold value is set based on an abnormality determination threshold value related to the remaining capacity variation and an estimation error of the remaining capacity variation.

3. The cell equalization system according to claim 2, wherein
when determining that the second equalization processing is necessary, the battery ECU calculates an operation time based on a maximum value of the remaining capacity variation, which is a largest variation of remaining capacity among the remaining capacity variation of the plurality of cells at the startup of ECU, the second threshold value, and an equalization current.

4. The cell equalization system according to claim 3, wherein
in the second equalization processing, the battery ECU maintains the sleep state, and the equalization control unit executes the equalization until the operation time elapses.

5. The cell equalization system according to claim 2, wherein
the cell equalization system is configured to execute the second equalization processing after the first equalization processing, and
the battery ECU is configured to
calculate an operation time of the first equalization processing based on a maximum value of the remaining capacity variation, which is a largest variation of remaining capacity among the remaining capacity variation of the plurality of cells at the startup of the ECU, the first threshold value, and an equalization current,
calculate the maximum value of the remaining capacity variation immediately before sleep of ECU in which the battery ECU changes from the startup state to the sleep state based on the maximum value of the remaining capacity variation at the startup of ECU, the operation time of the first equalization processing, and the equalization current, and
calculate an operation time of the second equalization processing after the first equalization processing based on the calculated maximum value of the remaining capacity variation, the second threshold value, and the equalization current.

6. The cell equalization system according to claim 1, wherein
the battery ECU is configured
to calculate the remaining capacity variation when an elapsed time from ignition off to the startup state exceeds a predetermined time, and
not to calculate the remaining capacity variation when the elapsed time is less than the predetermined time.

7. The cell equalization system according to claim 6, wherein
the battery ECU is configured to
determine whether the equalization is necessary based on the remaining capacity variation when the remaining capacity variation is calculated at the startup of ECU, and
determine whether the equalization is necessary based on the remaining capacity variation calculated last time when the remaining capacity variation is not calculated at the startup of ECU.

8. A cell equalization system comprising:
a battery including a plurality of chargeable cells connected in series and mounted on a vehicle;
a battery ECU configured to control the battery;
an equalization circuit configured to perform equalization of remaining capacity variation of the plurality of cells; and
an equalization control unit configured to control the equalization circuit, wherein
the battery ECU is configured to calculate the remaining capacity variation at startup of the battery ECU in which the battery ECU changes from a sleep state to a startup state, the cell equalization system is configured to execute
- first equalization processing for performing the equalization when the battery ECU is in the startup state, and
- second equalization processing for performing the equalization when the battery ECU is in the sleep state, and the battery ECU is configured to prohibit the first equalization processing during external charging of the battery and during constant voltage control.

* * * * *